United States Patent [19]

VanDenberg

[11] Patent Number: 5,788,263
[45] Date of Patent: Aug. 4, 1998

[54] SUSPENSION SYSTEM WITH LAMINATED BEAMS

[75] Inventor: Ervin K. VanDenberg, Massillon, Ohio

[73] Assignee: Suspensions Incorporated, Canal Fulton, Ohio

[21] Appl. No.: 647,216

[22] Filed: May 9, 1996

[51] Int. Cl.$^6$ .................................................. B60G 1/00
[52] U.S. Cl. ........................ 280/688; 280/711; 280/713; 280/725
[58] Field of Search ....................... 280/688, 711, 280/713, 725, 702, 699

[56] References Cited

U.S. PATENT DOCUMENTS

| | | | |
|---|---|---|---|
| 4,166,640 | 9/1979 | VanDenberg | 280/711 |
| 4,767,134 | 8/1988 | Booher | 280/719 |
| 4,772,044 | 9/1988 | Booher | 280/719 X |
| 5,020,824 | 6/1991 | Mounier-Poulat et al. | 280/686 |
| 5,037,126 | 8/1991 | Gottschalk et al. | 280/688 |
| 5,366,237 | 11/1994 | Dilling et al. | 280/711 |

*Primary Examiner*—Christopher P. Ellis
*Attorney, Agent, or Firm*—Sand & Sebolt

[57] ABSTRACT

A vehicle suspension system having a pair of hanger brackets and a pair of beams. A first end of each beam is attached, via a bushing sleeve to each hanger bracket, and an axle is rigidly attached to the second end of each beam. Each beam is manufactured from a plurality of layers of laminate material which extend circumferentially around the axle and the bushing sleeve. An adhesive layer extends between the bushing sleeve and axle, and the layers of laminate material, for securing the bushing sleeve and axle to the beam. Inasmuch as the laminate material and adhesive have a relatively low modulus of elasticity, these materials flex in response to movement of the axle, thereby assuring that the connection between the laminate beam and the axle remains stable, even as the axle moves in response to forces acting thereon. In another embodiment of the invention, each beam is integrally formed with an air spring piston. In another embodiment of the invention, a parallelogram suspension is provided with a pair of parallel and spaced-apart control arms manufactured of laminate material. Alternatively, the control arms of the parallelogram-type suspension may be integrally formed with a stabilizer bar extending therebetween. In alternative embodiments, a pair of air spring pistons may be mounted on the stabilizer bar, substantially reducing the weight and cost associated with the manufacture and operation of air spring suspension systems.

29 Claims, 9 Drawing Sheets

SUSPENSION SYSTEM WITH LAMINATED BEAMS

BACKGROUND OF THE INVENTION

1. Technical Field

The invention relates generally to an improved vehicle suspension system. More particularly, the invention relates to a beam type suspension system which provides a pair of beams which are both lightweight and simple to manufacture. Specifically, the invention relates to a suspension system having a laminate beam extending around the axle, and intermediate the axle and the hanger bracket.

2. Background Information

The trucking industry has witnessed a dramatic increase in the cost associated with transporting goods. Additionally, weight restrictions on over-the-road trucks have become increasingly stringent. These changes in the trucking industry pointed to a need for suspension systems that are lightweight and which safely support increasingly larger loads.

Suspension systems may take a variety of forms, including parallelogram suspensions, and leading and trailing beam type suspensions. Generally, leading and trailing beam type suspensions include a pair of longitudinally extending beams which may either be flexible or rigid, one of which is located adjacent each of two longitudinally extending frame rails located beneath the body of the truck or trailer. These beams are pivotally connected at one end to a hanger bracket extending downwardly from the frame, with an axle extending between the beams adjacent the other end. Additionally, an air or coil spring is generally positioned intermediate each frame rail and a corresponding beam. The beam may extend forwardly or rearwardly of the pivot, thus defining a leading or trailing beam respectively. Beam type suspension systems are used on a significant number of trucks and trailers, and must have sufficient strength to resist lateral and axial deflection while remaining stable. Lateral forces act on a suspension system in a variety of ways with the most common being that lateral forces act on a suspension as a vehicle negotiates a turn. As the vehicle turns, sheer stress acts between the tire and the road surface causing lateral force to be transferred through the tire wheel assembly to the axle. The axle, being rigidly attached to the suspension, transfers the lateral force into the beam causing it to deflect laterally. This lateral deflection can be extreme, and under certain loading conditions, can cause the tires to contact the vehicle frame rails.

Alternatively, parallelogram suspensions have been developed to solve a number of the problems associated with trailing beam type suspensions. However, parallelogram suspensions are not inherently roll rigid, and do not inherently provide lateral stiffness. Nonetheless, they continue to gain in popularity as parallelogram stabilized suspensions permit the air spring's full capacity to be utilized as the top and bottom air spring plate remain substantially parallel throughout axial lift operations. Specifically, when the air spring is mounted on a moving link of the parallelogram, it allows the utilization of the air spring's full lift capacity, compared to the typical trailing arm design where the air spring travels in an arc or "fans" open, stretching the rearmost internal reinforcing fibers of the spring, while not fully utilizing the forward part of the air spring.

Roll stability refers to the counteracting forces operating on the end of an axle causing one end of the axle to raise relative to the frame a distance greater than the other end of the axle. Roll instability is encountered when the vehicle frame tilts or rolls excessively relative to the axle; for example, when the vehicle negotiates a turn such that the centrifugal and acceleration forces reduce the downward forces acting on the inside wheel of the turn, and increase the downward force acting on the outside wheel of the turn to the point of loss of vehicle control or tip over. Some roll flexibility is needed to allow the axle to move relative to the frame; for example, during diagonal axle walk.

Diagonal axle walk occurs when the wheels at the opposite ends of the axle encounter unlike irregularities in a road or off-the-road surface, such as when one wheel rides over a curb. As the wheel rides over the curb, an upward force acts on that wheel, and a counteracting downward force acts on the wheel not riding over the curb. If the suspension is unable to provide flexibility between the axle and the frame as the tire-wheel assembly travels over the curb or ground irregularity, or alternatively to provide flexibility between the axle and the frame as the vehicle negotiates a turn, the suspension will be roll rigid, and may over-stress vehicle components.

Roll rigid suspensions are used to stabilize high center of gravity vehicles such as highway trailers. In these application, only enough roll compliance is permitted to allow the axle suspension to negotiate uneven terrain without unduly stressing the vehicle frame or axle. Typically, the roll angles of the axle frame are limited to 2 to 3 degrees in roll rigid suspensions. That is, if all the load were transferred to the tire or tires on one side of the vehicle and the tire or tires on the other side of the vehicle are completely off the ground, the angle of the axle relative to the frame reaches only about 2 to 3 degrees for a typical roll rigid suspension.

Conversely, roll flexible suspensions are used on low height vehicles and multi-axle vehicles which are stabilized with other suspensions. In these situations, the flexible suspensions operate to merely increase the load carrying capacity of the truck. In these application, tractive effort is paramount as a flexible suspension allows the tires to remain in contact with the ground. The tires must remain in contact to assure that the increased carrying capacity of the vehicle is evenly transmitted through the frame to the ground without inducing undue stress to the vehicle frame structure. Regardless of whether a roll rigid or roll flexible suspension is utilized, the suspension must be roll stable and provide the proper roll and lateral control needed to assure that the total vehicle is stable.

Traditionally, truck and trailer suspensions employ a resilient axle to beam connection, or alternatively the suspension includes a flexible, or spring beam in order to successfully take up vertical forces experienced during the vehicle operation. Alternatively, U.S. Pat. No. 4,166,640 provides a tri-functional resilient pivotal connection between the beam and the hanger bracket to provide a greater degree of deflection in response to centrifugal and acceleration forces and a lesser degree of radial deflection in response to forces acting along the axial length of the beam. The '640 reference thus provides a rigid beam in connection with a rigid axle to beam connection with the resilient bushing attaching the beam to the frame responding to vertical forces acting on the axle to create a roll stable suspension.

As bushings, and consequently mounting plates and mounting pins are not required for rigid axle to beam connections, suspension systems with rigid axle to beam connections may be manufactured substantially lighter than suspension systems requiring resilient axle to beam connections. Additionally, rigid beams are less expensive to manufacture than spring beams and thus rigid beam suspensions are less expensive than spring beam suspensions. A suspension that incorporates both of these characteristics is thus both lightweight and inexpensive.

U.S. Pat. No. 5,037,126 employs the basic concept of a tri-functional bushing shown in the '640 patent, and provides a rigid axle to beam connection.

U.S. Pat. No. 5,366,237 discloses a rigid axle to beam connection in combination with a rigid beam and tri-functional bushing. The '237 reference was developed in order to prevent the axle from stressing to an out-of-round cross-sectional configuration as a result of vertical forces imparted to the axle through centrifugal and acceleration forces as well as through diagonal axle walk. While the '237 reference is presumably adequate for the purpose for which it was intended in that it provides a rigid axle to beam connection, the weight of the suspension may still be reduced, and the axle to beam connection disclosed therein is somewhat difficult to assemble. Specifically, the axle must be slid into the orifice formed in each of the beams, substantially increasing production time, and consequently production costs.

While the use of a tri-functional bushing is presumably adequate for the purpose for which it is intended in that it eliminates the need to use expensive spring steel associated with spring beam suspensions, as well as reduces the weight associated with resilient axle to beam connections, tri-functional bushings are relatively expensive to manufacture, and subject to cyclic failure.

An additional problem associated with suspension systems having rigid axle to beam connections is that the axle warranty is void if a weld is positioned within 1.5 inches of the vertical axis on either the top or the bottom of the axle. Welding in this area is forbidden by the axle manufacturer as these areas receive the largest compression and tension forces.

The need thus exists for a roll stable suspension system which eliminates the use of expensive spring steel as used in spring beam suspensions, provides a rigid axle to beam connection, and eliminates the use of tri-functional bushings. Additionally, the need exists for a suspension system which is lightweight, easy to assemble, simple to manufacture, and which permits the axle to move to an out-of round condition while simultaneously providing a rigid axle to beam connection. By providing a material having a low modulus of elasticity adjacent the rigid axle to beam connection such that as the axle flexes, the beam material adjacent the axle flexes, without fracture, to permit the axle to move in response to forces input thereto.

SUMMARY OF THE INVENTION

Objectives of the invention include providing a vehicle suspension system that is roll stable, and resistant to lateral and longitudinal forces.

Another objective is to provide a vehicle suspension system with a rigid axle to beam connection.

A further objective is to provide a vehicle suspension system where the beams are manufactured of laminated material having a modulus of elasticity significantly lower than that of the axle, whereby the axle deforms in response to input forces with the beam material adjacent the axle deforming without fracture and remaining rigidly attached to the axle.

A still further objective is to provide a vehicle suspension in which each beam is assembled by forming the beam around the axle to form a rigid axle to beam connection.

Yet another objective is to provide a vehicle suspension system in which each beam is manufactured to remain resistant to lateral forces, while remaining sufficiently flexible to assure that the suspension remains roll stable.

Still another objective is to provide a vehicle suspension system in which the flexibility of the laminate beams may be manufactured to fit the needs associated with a particular suspension system.

Yet a further objective is to provide a vehicle suspension system whereby the beam is adhesively attached to the axle.

Another objective is to provide a vehicle suspension system in which an air spring piston is integrally formed with each laminated beam.

A still further objective is to provide such a vehicle suspension system which is of simple construction, which achieves the stated objectives in a simple, effective and inexpensive manner, and which solves problems and satisfies needs existing in the art.

These and other objectives and advantages of the invention are obtained by the improved vehicle suspension system, the general nature of which may be stated as including a pair of spaced apart beams formed with a first end, a second end, a top wall and a bottom wall; said top wall and bottom wall being formed from a plurality of laminated layers of material; a cross-member extending intermediate the spaced apart beams; pivot means attached to the first end of each beam for pivotally mounting each beam to the frame; and r means extending intermediate one of the cross-members and the beams and the frame for supporting vertical loads into the suspension.

BRIEF DESCRIPTION OF THE DRAWINGS

The preferred embodiments of the invention, illustrative of the best modes in which applicant has contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENTS

Figure 1:
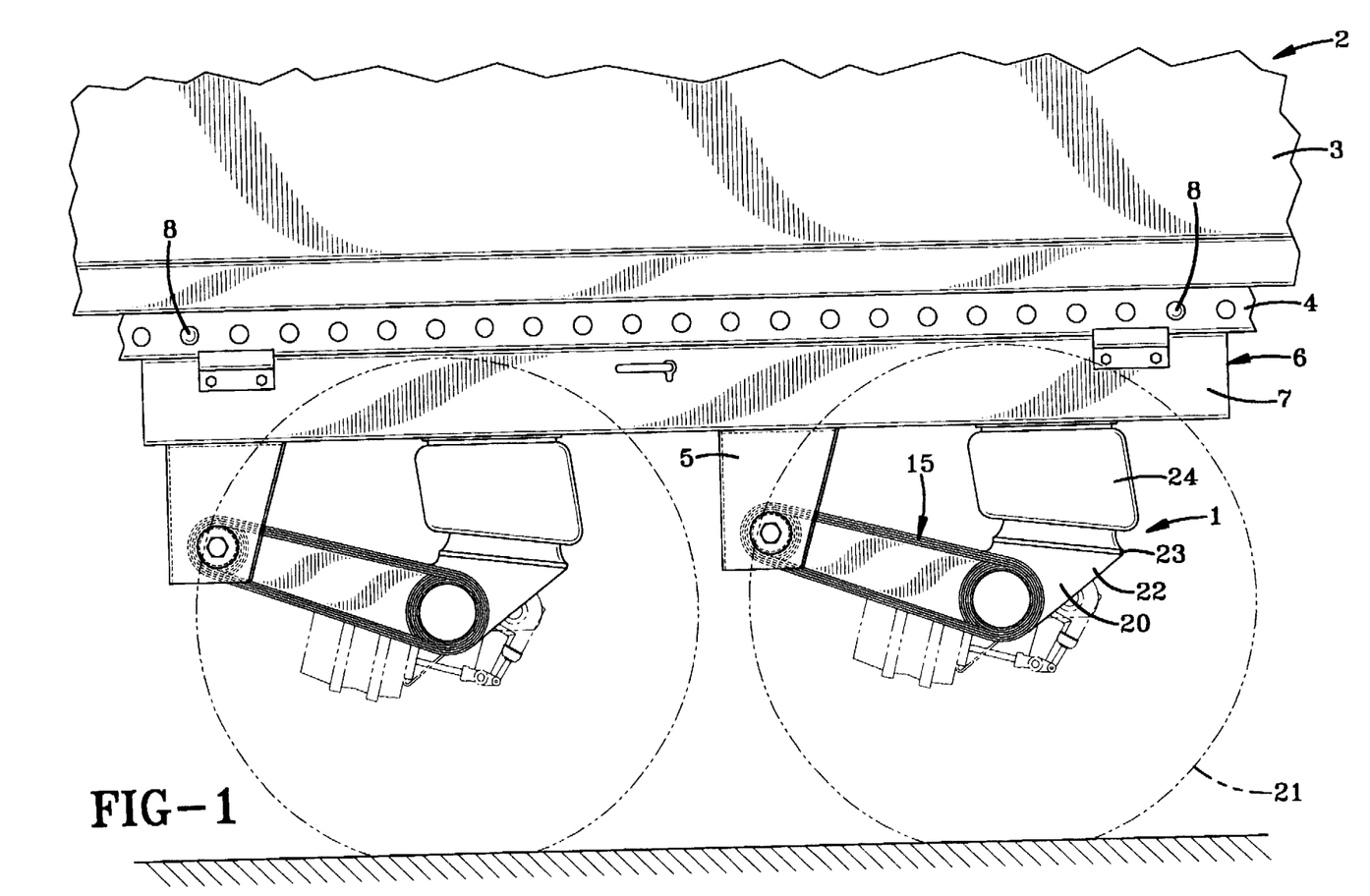
FIG. 1 is a side elevational view of a pair of vehicle suspension systems with the tires and brake assemblies shown in dot-dash lines, and shown attached to a vehicle.

The improved vehicle suspension system of the present invention is indicated generally at 1, and is particularly shown in FIG. 1 mounted on a vehicle 2, such as a truck or trailer. Vehicle 2 includes a cargo box 3 supported by a pair of frame rails 4 extending longitudinally beneath cargo box 3 and along the length of vehicle 2. Suspension system 1 includes a pair of hanger brackets 5 welded to a slider frame 6, which includes a pair of parallel and spaced-apart slide channels 7. Slide channels 7 are spaced apart a distance equal to the distance between frame rails 4 and are mounted to frame rails 4 with a plurality of locking pins 8. Referring to FIG. 1, a pair of identical suspension systems 1 are shown installed on vehicle 2, with only one being described in detail herein below.

Figure 2:
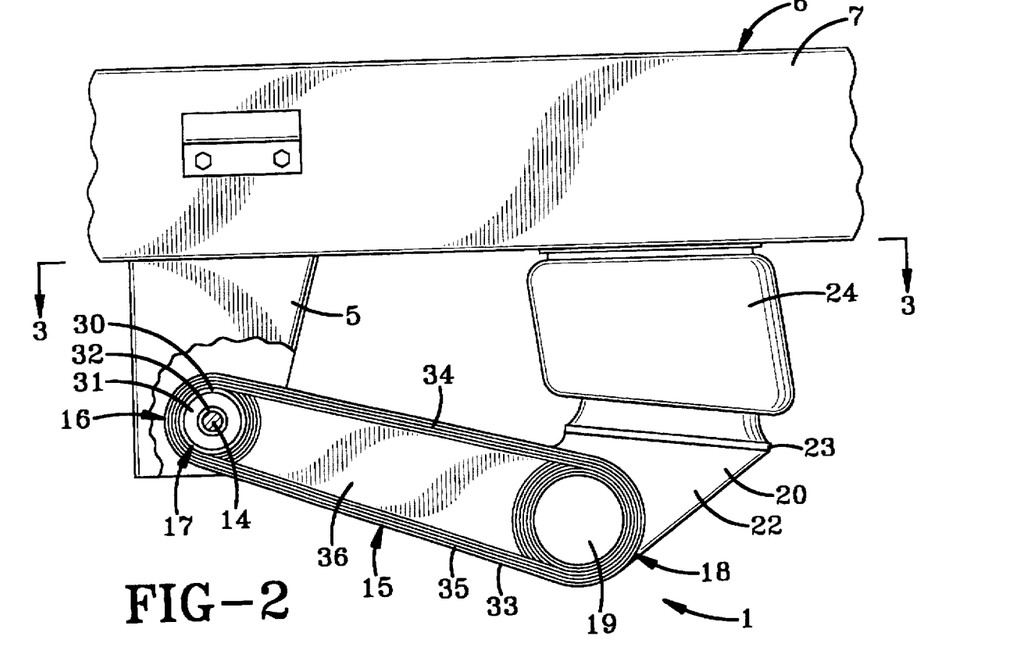
FIG. 2 is an enlarged side elevational view of one of the vehicle suspension systems shown in FIG. 1 with portions cut away.
Figure 3:
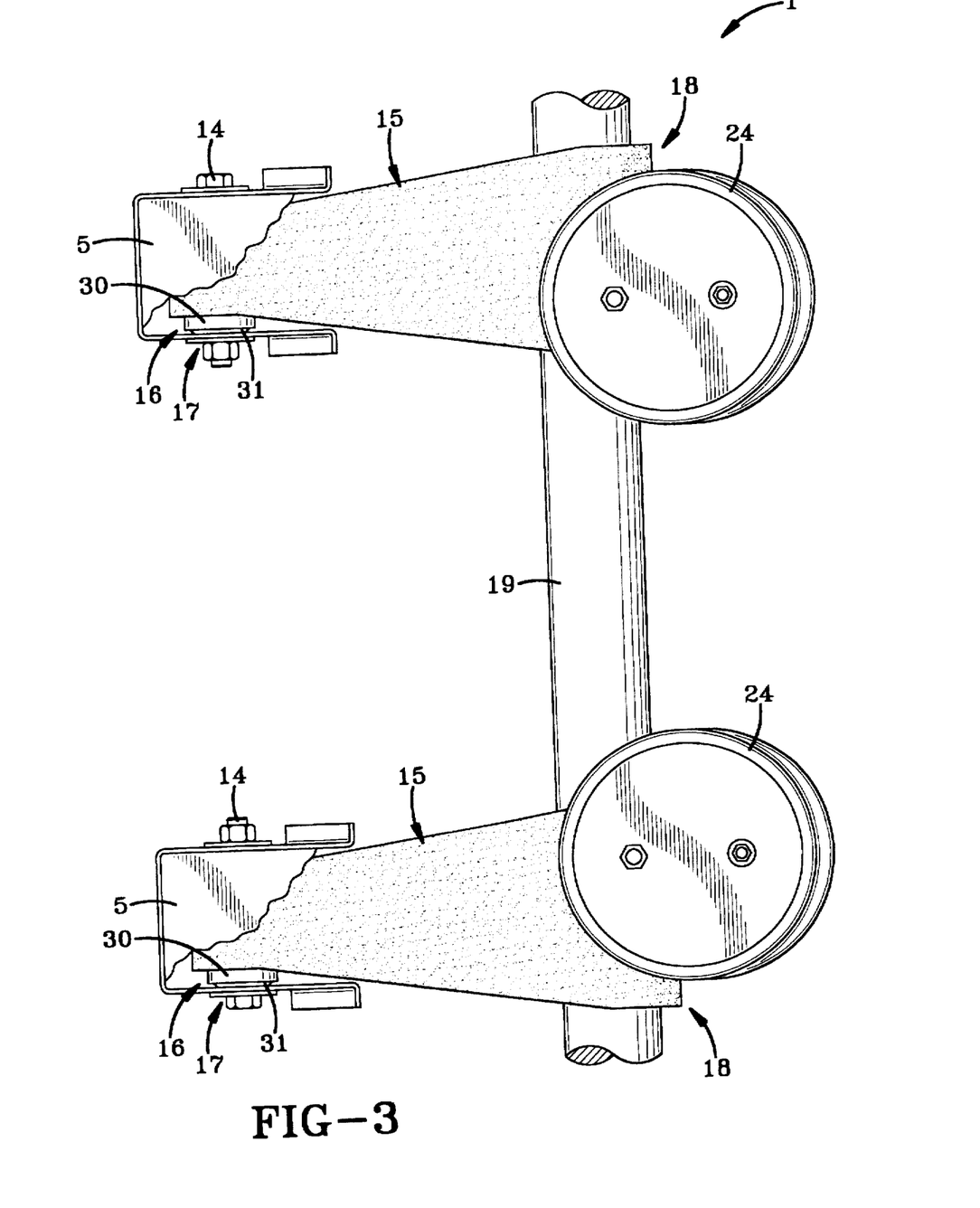
FIG. 3 is a top plan view taken along line 3—3, FIG. 2, with portions cut away.

Suspension system 1 includes a pair of spaced-apart trailing beams 15 (FIGS. 2–3). Inasmuch as trailing beams 15 are identical, only one will be described in detail. The first end 16 of each trailing beam 15 is mounted to a respective hanger bracket 5 at a pivot 17, and a second end 18 of each trailing beam 15 supports an axle 19. A tire-wheel assembly 21 is mounted to each end of axle 19. A mounting bracket 20 is mounted to second end 18 of trailing beam 15 with each mounting bracket 20 including a pair of lower flanges 22 and an air spring mounting plate 23. An air spring 24 is interposed between air spring mounting plate 23 and slider frame 6 for supporting vehicle 2 and vertical loads associated therewith.

Pivot 17 includes a bushing sleeve 30 (FIGS. 2 and 3). A bushing 31 is interference fitted within bushing sleeve 30 and an inner sleeve 32 is mounted within bushing 31. A pivot pin 14 passes through hanger bracket 5 and inner sleeve 32 to mount trailing beam 15 to hanger bracket 5.

In accordance with one of the main features of the present invention, trailing beams 15 are formed with a plurality of layers of laminate material 33. More specifically, a first layer of material is wrapped around bushing 30 and axle 19, with a predetermined distance extending between bushing 30 and axle 19. Successive layers of mounting material are then laid on the first layer of laminate material to retain bushing 30 and axle 19 against movement relative to laminate material 33. In the preferred embodiment, a plurality of layers of laminate material extend circumferentially around bushing sleeve 30 and axle 19. However, layers of laminate material 33 may extend around only a portion of bushing sleeve 30 or axle 19 without departing from the spirit of the present invention. The first layer of laminate material 33 is adhesively secured to bushing sleeve 30 and axle 19 to retain the axle against movement.

The plurality of layers of laminate material 33 not only extend around both axle 19 and bushing sleeve 30, laminate material 33 also forms top wall 34 and bottom wall 35 of each trailing beam 15. Additionally, a number of layers of laminate material 33 extend intermediate top wall 34 and bottom wall 35 to form side walls 36.

The adhesive material used to secure laminate material 33 to axle 19 and bushing sleeve 30 should be an adhesive material having a modulus of elasticity in the range of from $0.4 \times 10^6$ PSI to $0.5 \times 10^6$ PSI. Similarly, the plurality of layers of laminate material 33 should be manufactured of a material having a modulus of elasticity in the range of from $3.0 \times 10^6$ PSI to $15 \times 10^6$ PSI, such as fiberglass mesh material.

However, the plurality of layers of laminate material 33 may also take a variety of other configurations without departing from the spirit of the present invention.

While trailing beams 15 may take a variety of sizes and configurations, in the preferred embodiment, they are tapered outwardly from first end 16 toward second end 18 to limit the lateral deflection of suspension system 1, and to increase deflection resistance as a result of torque forces imparted to axle 19. Additionally, inasmuch as the adhesive and laminate material 33 have a modulus of elasticity in the range of from $0.4 \times 10^6$ PSI to $15 \times 10^6$ PSI, and the axle has a modulus of elasticity in the range of from $28 \times 10^6$ PSI to $30 \times 10^6$ PSI, the axle will be permitted to move to an out-of-round condition, and deflect relative to trailing beams 15 without causing the beam to fracture as the material will permit the beam to remain firmly attached to the axle as the axle responds to forces received from tire-wheel assemblies 21. As should also be appreciated from a review of FIGS. 1–3, the thickness of trailing beam 15 adjacent axle 19 may be increased to increase the beam's resistance to lateral deflection. Additionally, inasmuch as laminate 33 is adhesively attached to axle 19 over a large surface area, the force felt by the adhesive layer per unit surface area is relatively small when compared to the overall force received by the axle from tire-wheel assemblies 21. More particularly, forces received by axle 19 from tire-wheel assemblies 21 are in the range of from 30,000–70,000 pounds per square inch. However, inasmuch as trailing beams 15 are adhesively secured to axle 19 over a large surface area, the force per square inch felt by the adhesive is in the range of only from 1,500–2,000 pounds per square inch. The strength of the axle-to-beam connection may be further increased by merely increasing the surface area over which beams 15 are attached to axle 19.

In operation, beams 15 flex similar to conventional spring beam suspension systems to assure that suspension system 1 is roll stable, permitting sufficient flexure along the length of laminate beams 15 to compensate for centrifugal and acceleration forces experienced during turn negotiation, and vertical forces experienced during diagonal axle walk. Additionally, inasmuch as fiberglass material is extremely resistant to longitudinal forces, laminate beams 15 are extremely resistant to longitudinal forces experienced along the length of trailing beams 15. Additionally, suspension system 1 is lightweight as a result of the rigid axle-to-beam connection, whereby axle 19 is adhesively secured within laminate beams 15, and, additionally, as a result of the use of lightweight fiberglass material to manufacture beams 15. Suspension system 1 is also easy to assemble as trailing beams 15 are assembled around axle 19 and do not require the manufacturer to subsequently attach the axle to each trailing beam 15. As is also apparent from a review of FIGS. 1–3, the thickness and configuration of top wall 34, bottom wall 35 and side walls 36 may be varied to tailor the resulting spring rate to the requirements of a particular vehicle 2. More particularly, if additional layers of laminate material 3 are added to top wall 34, bottom wall 35 and side walls 36, the flex rate of beams 15 will substantially increase, thereby creating a roll rigid suspension. Alternatively, if top wall 34, bottom wall 35 and side walls 36 are manufactured with fewer layers of laminate 33, suspension system 1 will remain more flexible, and, thus, will be less roll rigid.

Figure 4:
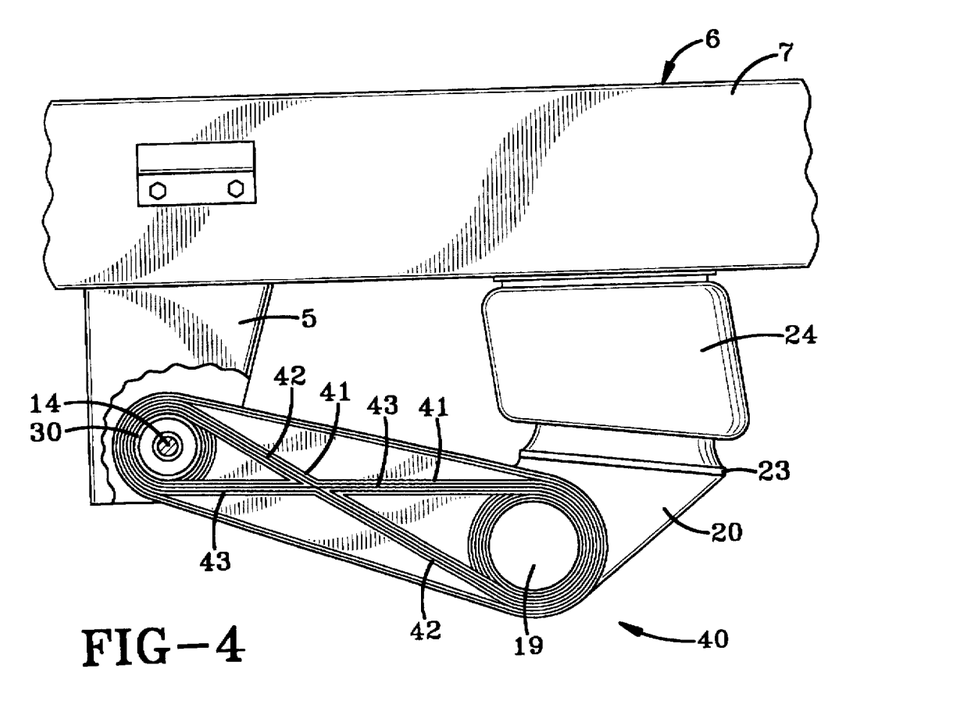
FIG. 4 is a side elevational view of a second embodiment of the present invention, with portions cut away.
Figure 5:
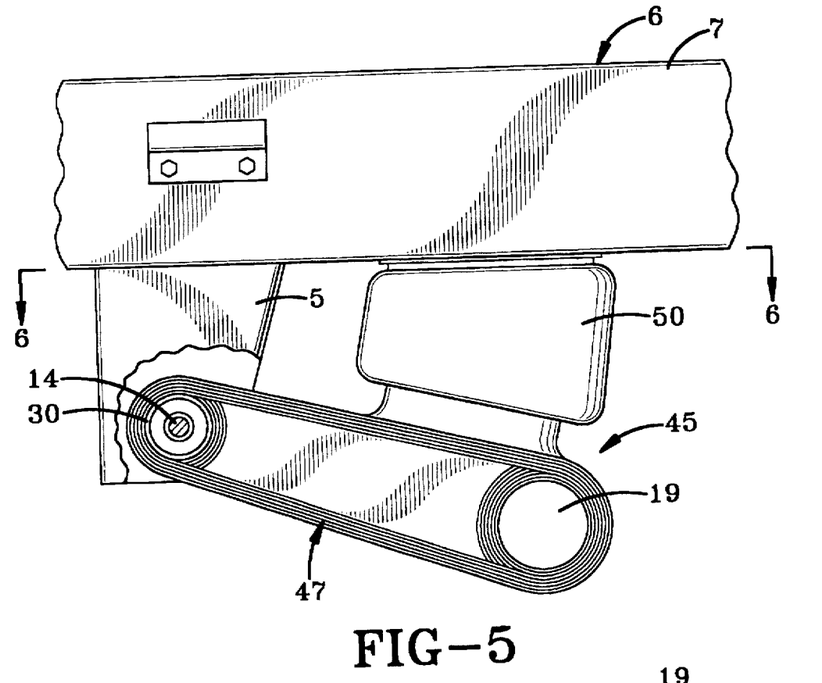
FIG. 5 is a side elevational view of a third embodiment of the present invention with portions cut away.
Figure 6:
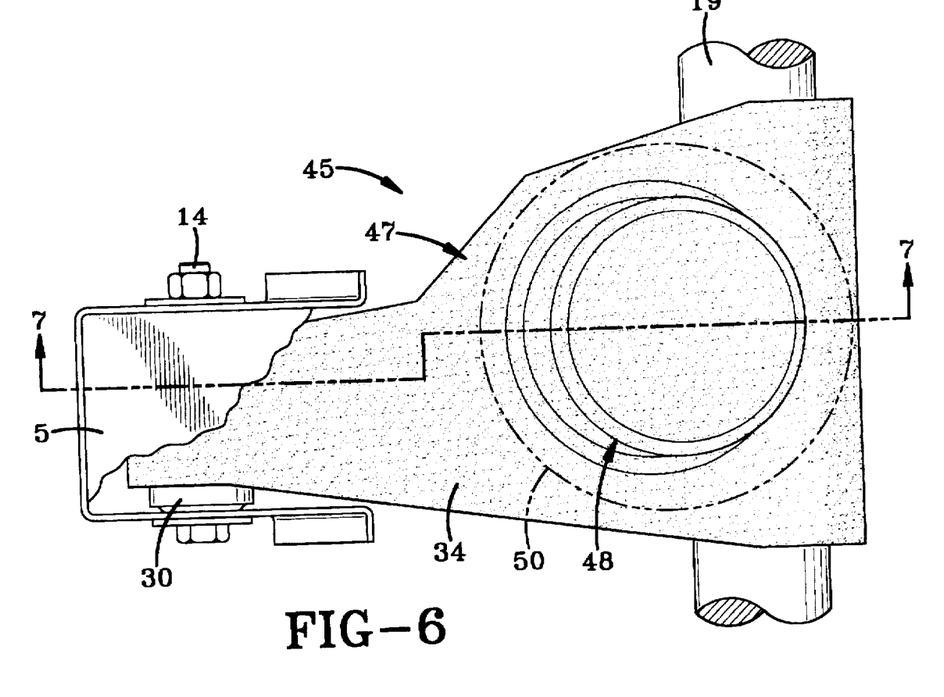
FIG. 6 is an enlarged top view taken along line 6—6, FIG. 5 with portion cut away.
Figure 7:
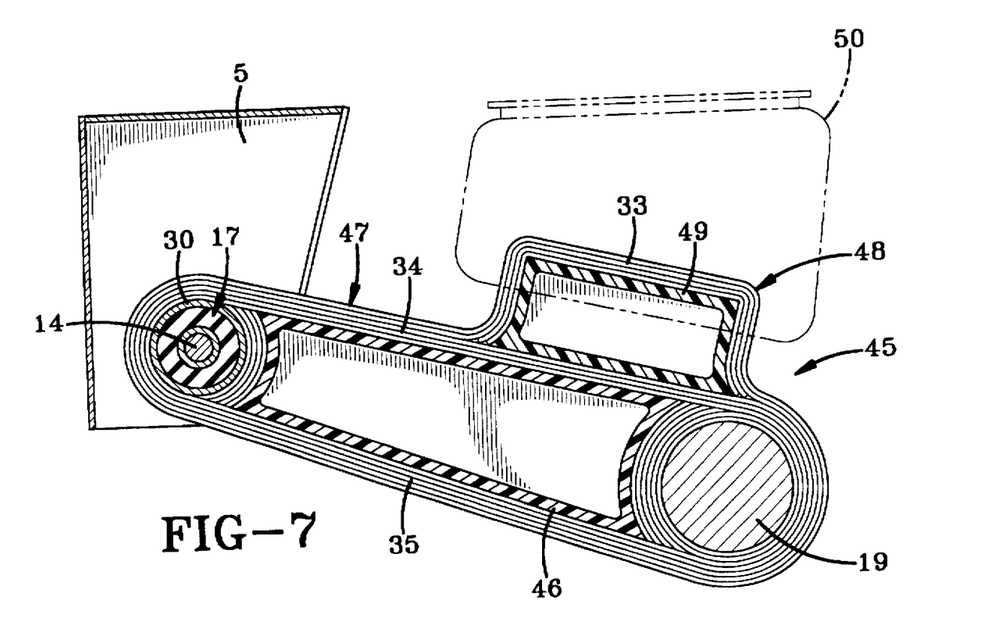
FIG. 7 is a sectional view taken along line 7—7, FIG. 6.
Figure 8:
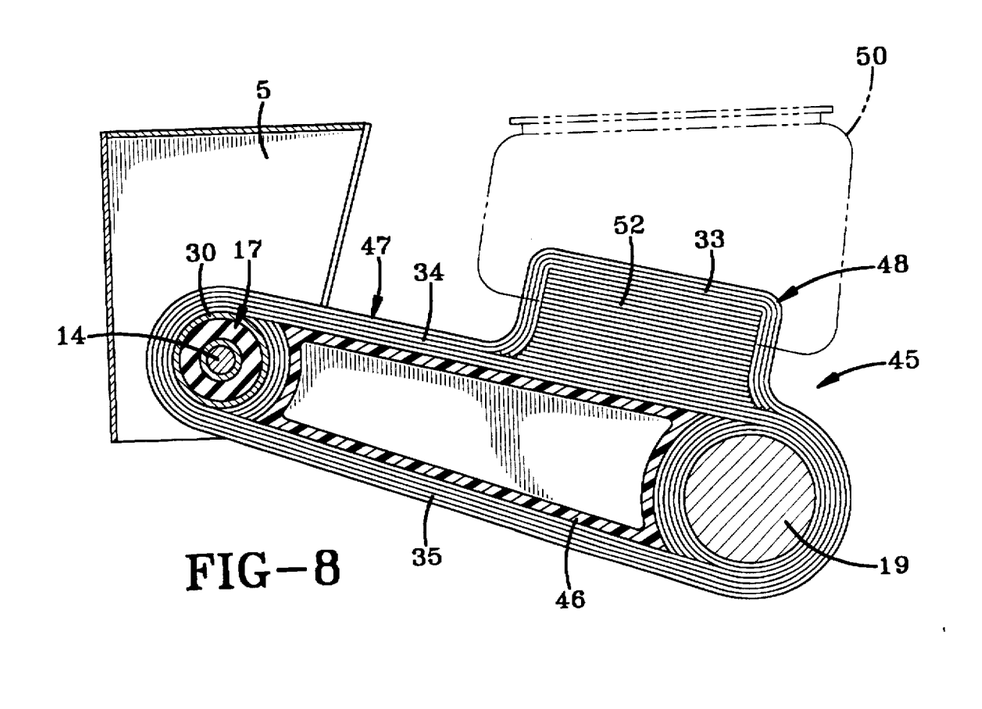
FIG. 8 is a sectional view similar to FIG. 7, with an alternative air spring piston.

In accordance with a second embodiment of the present invention, a suspension system is indicated generally at 40, and is shown particularly in FIG. 4. Suspension system 40 is identical to suspension system 1 in every respect, except that it includes a plurality of laminate layers 41 which cross diagonally between bushing sleeve 30 and axle 19. More specifically, one layer of material 42 extends from adjacent the top of bushing sleeve 30 to the bottom of axle 19, while a number of other layers 43 extend adjacent from the bottom of bushing sleeve 30 to adjacent the top of axle 19. Layers 42 and 43 may also be increased and decreased in thickness to create a more roll rigid or less roll rigid suspension system and to meet the requirements of a particular vehicle 2.

A third embodiment of the present invention is indicated generally at 45, and is shown particularly in FIGS. 5–8. Suspension system 45 is similar to suspension systems 1 and 40 in that it includes a pair of trailing beam 47 adhesively attached to a bushing sleeve 30 and an axle 19 and is formed with a top wall 34 and a bottom wall 35. However, each trailing beam 47 is provided with a cardboard or plastic insert 46 (FIG. 7) positioned intermediate axle 19, bushing sleeve 30, top wall 34 and bottom wall 35. Insert 46 may take a variety of sizes and configuration, but is preferably complimentary-sized to the space defined longitudinally between axle 19 and bushing sleeve 30, and vertically between top wall 34 and bottom wall 35. Insert 46 operates merely to offer rigidity to trailing beams 47 when they are manufactured.

Top wall 34 of trailing beam 47 is integrally formed with an air spring piston 48. Specifically, an insert 49 is positioned on top wall 34 and multiple layers of laminate material 33 are positioned around insert 49 and trailing beam 47 to provide a trailing beam 47 with an integrally formed air spring piston 48. Air spring 50 may then be secured directly to air spring piston 48, substantially reducing the weight and cost associated with air spring utilization and construction. Alternatively, and referring specifically to FIG. 8, air spring 48 may be formed from a plurality of parallel layers of laminate material 52, which layers are then enveloped by a plurality of layers of laminate material 33.

Figure 9:
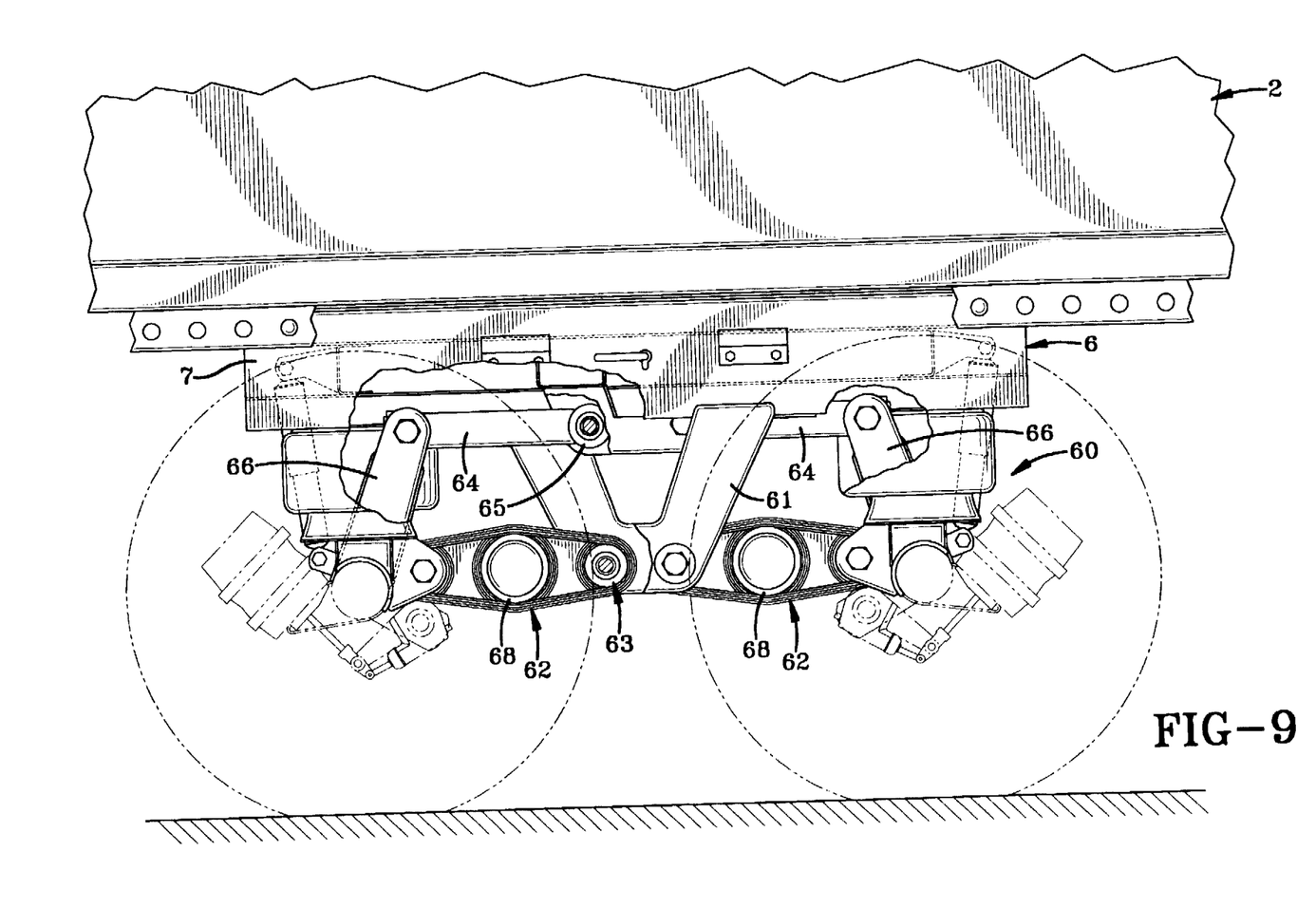
FIG. 9 is a side elevational view of a fourth embodiment of the present invention, with the tires and brake assembly shown in dot-dash lines, and shown attached to a vehicle.
Figure 10:
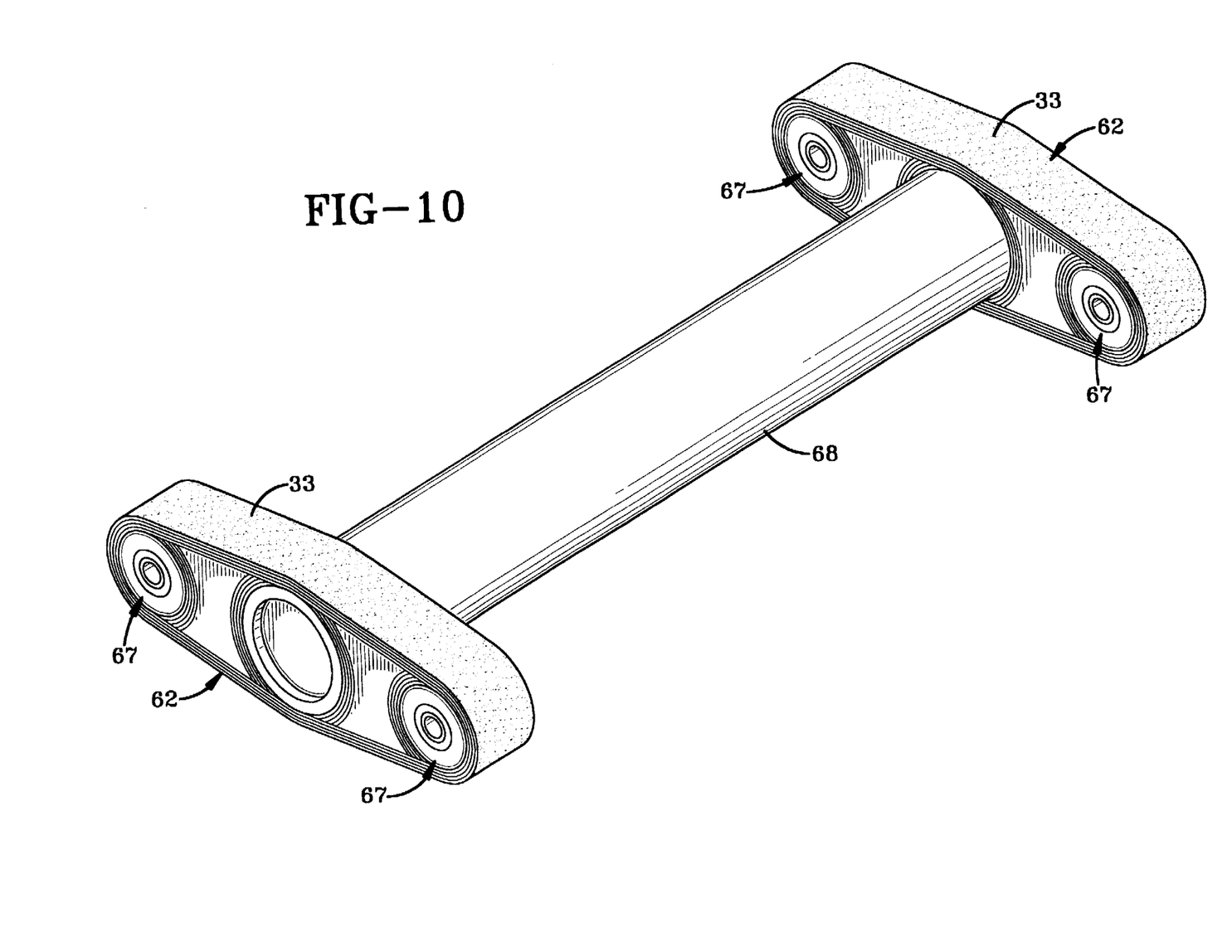
FIG. 10 is a perspective view of the beams and stabilizer bar of the suspension system shown in FIG. 9.

The fourth embodiment of the present invention is indicated generally at 60, and is shown particularly in FIGS. 9–10 mounted on a vehicle 2, similar to vehicle suspension system 1. A pair of hanger brackets 61 extend downwardly from slide channel 7 of slide frame 6. Suspension system 60 includes a pair of parallel and spaced-apart control arms 62 pivotally mounted to respective hanger brackets 61 at a corresponding pivot 63, as well a pair of torque arms 64 with one end of each torque arm 64 mounted to a hanger bracket 61 at a pivot 65. The other end of each torque arm 64 is mounted to an axle leg 66. Hanger bracket 61, control arm 62, torque arm 64 and axle leg 66 thus combine to form a parallelogram suspension system.

Figure 11:
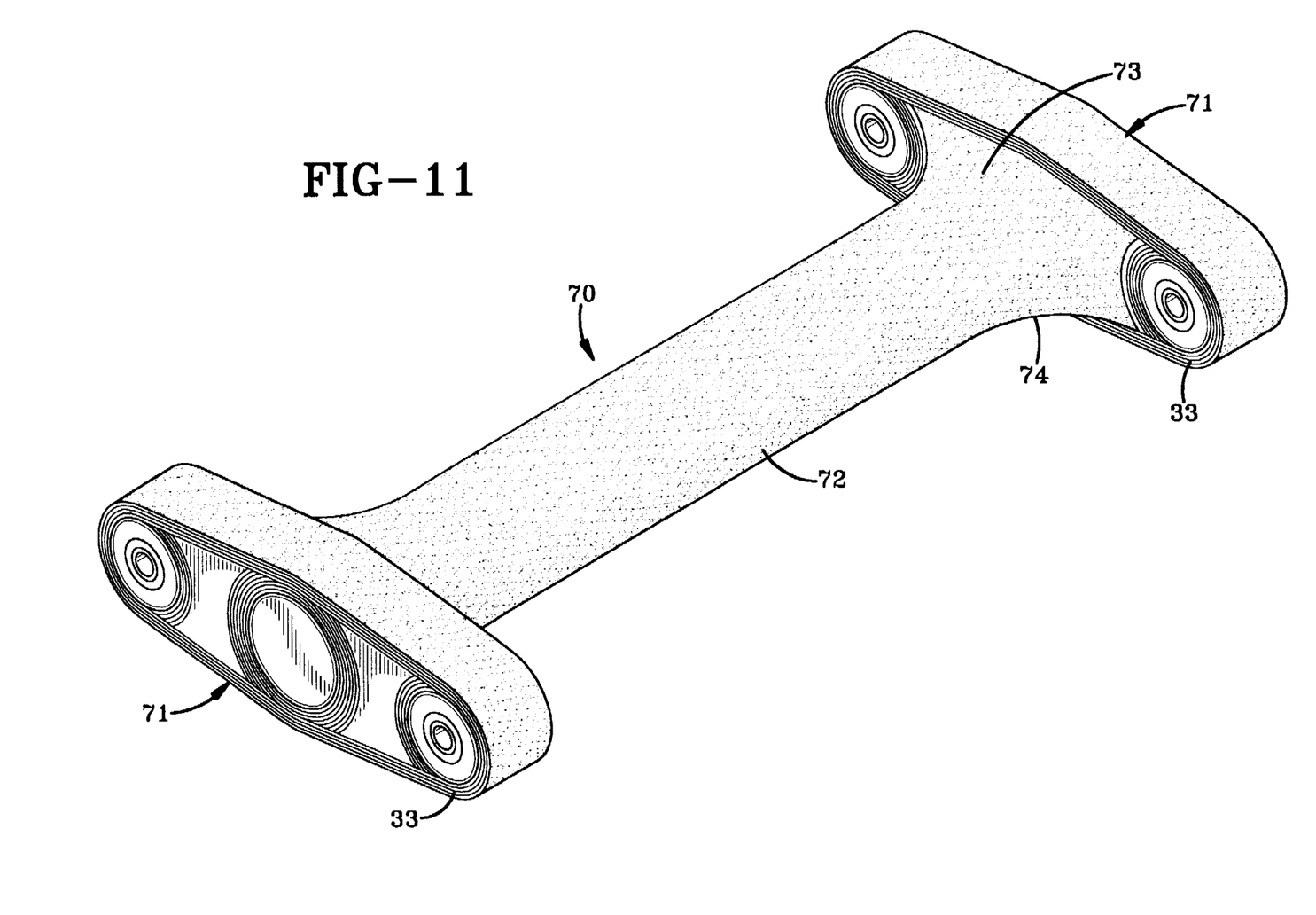
FIG. 11 is a perspective view of an alternative pair of beams and stabilizer bar similar to FIG. 10.

In accordance with one of the main features of the fourth embodiment of the present invention, and referring specifically to FIG. 11, control arms 62 are each formed with a pivot assembly 67 on either end thereof and are formed around a stabilizer bar 68. Control arms 62 are formed substantially identical to the formation of trailing beams 15 of suspension system 1. A plurality of layers of laminate material 33 are positioned circumferentially around each pivot assembly 67 and stabilizer bar 68. Additional layers of laminate material 33 are then positioned around stabilizer bar 68, and pivot assembly 67, such that pivot assembly 67 and stabilizer bar 68 are positioned apart a predetermined distance. Again, inasmuch as the adhesive layer used to secure laminate material 33 to stabilizer bar 68 has a relatively high modulus of elasticity, the adhesive will flex in response to movement of stabilizer bar 68 without fracturing, thereby assuring that stabilizer bar 68 remains securely and adhesively attached to each control arm 62.

Additionally, as is also apparent from a review of FIGS. 10 and 11, the number of layers of laminate material 33 positioned around stabilizer bar 68 may be varied to increase the flexibility of control arm 62 relative to stabilizer bar 68.

A fifth embodiment of the present invention is indicated generally at 70, and is shown particularly in FIG. 11. The fifth embodiment of the present invention is similar to the fourth embodiment of the present invention and includes a pair of control arms 71, and a stabilizer bar 72. However, in the fifth embodiment of the present invention, control arm 71 and stabilizer bar 72 are integrally formed from layers of laminate material 33 such that the joint area 73 between each control arm 71 and stabilizer bar 72 is formed with a circumferentially extending radius 74 to assure that the transition of force from control arm 71 to stabilizer bar 72 is smooth, and not subject to point load failure.

Figure 12:
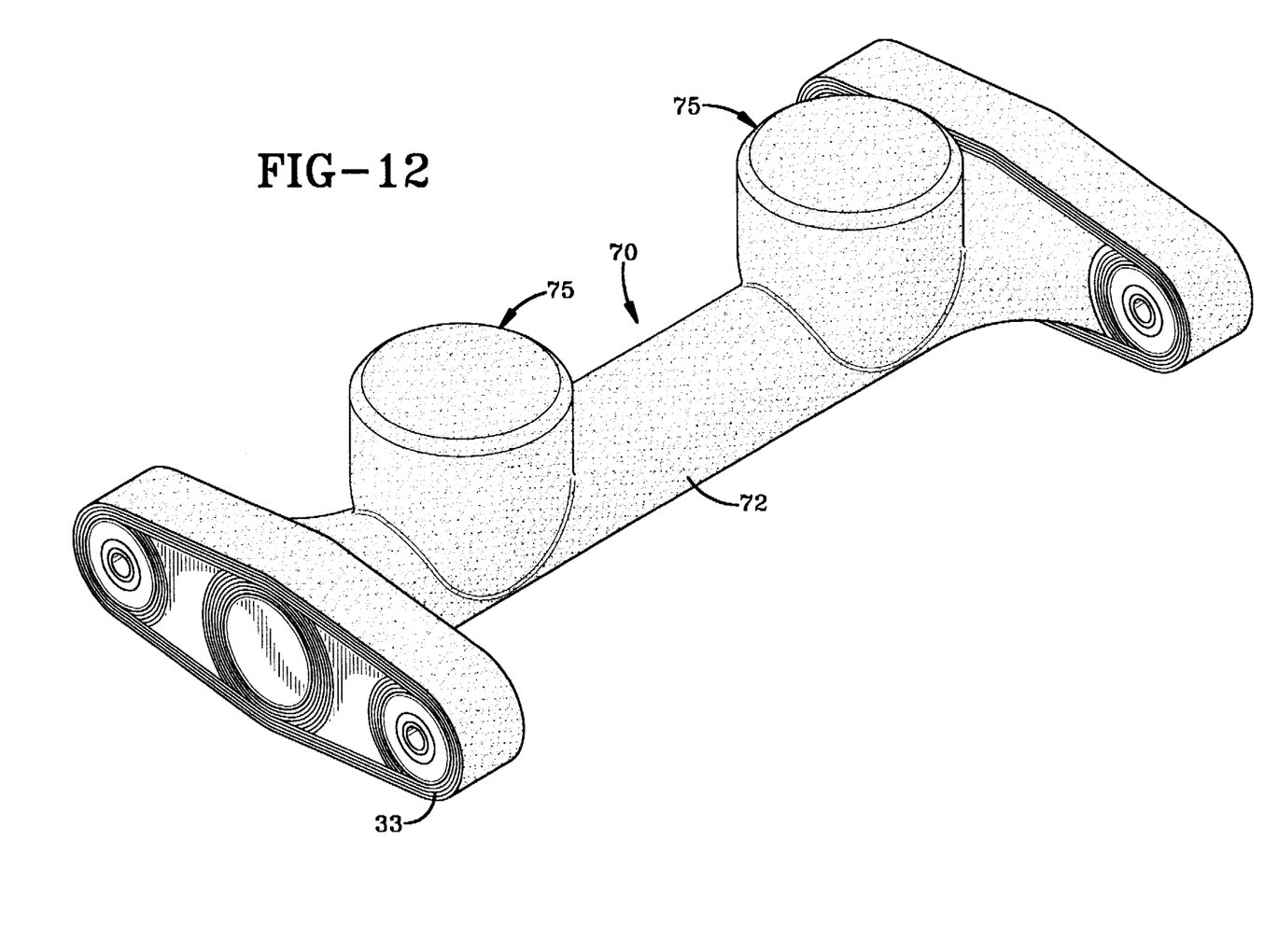
FIG. 12 is a perspective view similar to FIG. 11, with a pair of laminate air spring pistons formed on the stabilizer bar.

Referring to FIG. 12, suspension system 70 is shown with a plurality of air spring pistons 75 integrally formed with stabilizer bar 72. Air spring pistons 75 operate substantially identical to air spring pistons 48 of the third embodiment of the present invention, further reducing the weight and cost associated with the utilization and manufacture of air springs in suspension systems.

Additionally with respect to suspension systems 1, 40, 45, 60 and 70, the trailing beams manufactured of laminate material may be manufactured to provide a longitudinal rate of deflection, a vertical rate of deflection and a lateral rate of deflection. In the majority of circumstances, each beam will be manufactured in such a manner that the longitudinal rate of deflection and the vertical rate of deflection are significantly smaller than the vertical rate of deflection in order to assure that suspension system 1 is roll stable and that the associated cross member remains substantially perpendicular to the direction of travel of vehicle 2.

In summary, suspension systems 1, 40, 45, 60 and 70 provide a rigid axle-beam connection which is easy to assemble and which is lightweight by providing a rigid connection between the axle or cross-member and the beams, and by providing a flexible beam manufactured of a plurality of layers of laminate material 33. Additionally, a beam may be manufactured to increase its resistance to lateral deflection by increasing the width of the beam adjacent the axle. Additionally, by increasing beam width adjacent the axle or cross member, a large surface area is utilized to adhesively attach the beam to the cross-member. Such large surface area assures that the force-per-unit area on the adhesive is relatively small when compared to the force experienced by the axle or cross-member and beam. Still further, inasmuch as the beam is manufactured of laminate material, it is extremely lightweight, and will include a flex rate tailored to meet the specifications of a particular vehicle. The weight of the suspension system of a number of the embodiments of the present invention are further reduced by providing air spring pistons integrally formed with the beams and cross members.

Accordingly, the improved suspension system is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved suspension system is constructed and used, the characteristics of the construction, and the advantageous, new and useful results obtained; the new and useful structures, devices, elements, arrangements, parts and combinations, are set forth in the appended claims.

I claim:

1. A suspension system for use with a vehicle having a frame, the suspension system comprising:

a pair of spaced apart beams formed with a first end, a second end, a top wall and a bottom wall; said top wall and bottom wall being formed from a plurality of laminated layers of material;

a cross-member extending intermediate the spaced apart beams;

pivot means attached to the first end of each beam for pivotally mounting each beam to the frame; and spring means extending intermediate one of the cross-members and the beams and the frame for supporting vertical loads into the suspension.

2. The suspension system as defined in claim 1 in which a portion of the laminated layers extend at least partially around the first end and the second end along the top wall and the bottom wall.

3. The suspension system as defined in claim 2 in which a portion of the laminated layers extend at least partially around the cross-member; and in which adhesive means attaches each beam to the cross-member for retaining the cross-member against movement relative to the beam.

4. The suspension system as defined in claim 3 in which the laminated layers extend circumferentially around the cross-member.

5. The suspension system as defined in claim 3 in which the cross-member is positioned adjacent the second end of the beams.

6. The suspension system as defined in claim 5 in which the cross-member is an axle.

7. The suspension system as defined in claim 3 in which the cross member is positioned intermediate the first end and second end of the beams.

8. The suspension system as defined in claim 2 in which the laminated layers extend at least partially around the pivot means adjacent the first end and are adhesively attached thereto.

9. The suspension system as defined in claim 8 in which the pivot means comprises an outer sleeve; an inner sleeve; a elastomeric bushing positioned intermediate the inner and outer sleeve; a pivot pin extending through the inner sleeve and adapted to extend through the frame; and adhesive means for securing the laminated layers to the outer sleeve thereby preventing movement of the outer sleeve relative to the laminated layers.

10. The suspension system as defined in claim 3 in which the modulus of elasticity of the material of the laminated layers is greater than the modulus of elasticity of the cross-member thereby assuring that the cross-member can deflect while maintaining a strong adhesive bond between the beams and the cross-member.

11. The suspension system as defined in claim 2 in which the top wall and the bottom wall of each beam are tapered outwardly from adjacent the first end to adjacent the second end whereby the beam is narrower adjacent the first end than the beam adjacent the second end.

12. The suspension system as defined in claim 2 in which a hollow block is positioned between the pivot means and the cross-member for supporting the top wall and the bottom wall.

13. The suspension system as defined in claim 2 in which each beam has a longitudinal rate of deflection and a vertical rate of deflection, and in which the longitudinal rate of deflection differs from the vertical rate of deflection.

14. The suspension system as defined in claim 2 in which each beam has a lateral rate of deflection, and in which the lateral rate of deflection varies from the vertical rate of deflection.

15. The suspension system as defined in claim 2 in which each beam has a longitudinal rate of deflection, a vertical rate of deflection, and a lateral rate of deflection, and in which the longitudinal rate of deflection and the lateral rate of deflection are smaller than the vertical rate of deflection.

16. The suspension system as defined in claim 2 in which each beam has a hollow center and in which a plurality of laminated layers extend diagonally across the hollow center of the beam from the top wall to the bottom wall.

17. The suspension system as defined in claim 16 in which each beam has a hollow center; and in which a plurality of laminated layers extend from adjacent the top wall adjacent one of the first and second ends to adjacent the bottom wall adjacent the other of the first and second ends and through the hollow center of the beam.

18. The suspension system as defined in claim 2 in which the spring means is an air spring; in which each one of the beam and the cross-member is integrally formed with at least one air spring piston.

19. The suspension system as defined in claim 18 in which the air spring piston is formed from a plurality of laminate layers.

20. The suspension system as defined in claim 19 in which a hollow block is positioned on the top wall of one of the beam and the cross-member, and in which the plurality of laminated layers extend over the hollow block.

21. The suspension system as defined in claim 1 in which the laminate material is fiberglass epoxy.

22. A trailing or pushing beam for use with a suspension system having a frame; said beam comprising:

a first end and a second end;

a top wall and a bottom wall extending between the first and second ends; and a plurality of laminated layers extending between the first and second ends forming the top wall and the bottom wall and defining a hollow interior.

23. A beam for use with a suspension system having a frame; said beam comprising:

a first end and a second end;

a top wall and a bottom wall extending between the first and second ends;

a plurality of laminated layers extending between the first and second ends forming the top wall and the bottom wall and circumferentially around the first end and the second end and along the top wall and the bottom wall.

24. The beam as defined in claim 23 in which the top wall and the bottom wall of each beam are tapered outwardly from adjacent the first end to adjacent the second end whereby the beam is narrower adjacent the first end than the beam adjacent the second end.

25. The beam as defined in claim 24 in which each beam has a longitudinal rate of deflection, and a vertical rate of deflection, and in which the longitudinal rate of deflection differs from the vertical rate of deflection.

26. The beam as defined in claim 25 in which the beam has a lateral rate of deflection, and in which the lateral rate of deflection varies from the vertical rate of deflection.

27. The beam as defined in claim 22 in which each beam has a longitudinal rate of deflection, a vertical rate of deflection, and a lateral rate of deflection, and in which the longitudinal rate of deflection and the lateral rate of deflection are higher than the vertical rate of deflection.

28. A beam for use with a suspension system having a frame; said beam comprising:

a first end and a second end;

a top wall and a bottom wall extending between the first and second ends;

a plurality of laminated layers extending between the first and second ends forming the top wall and the bottom wall; and a plurality of laminated layers extending diagonally across the hollow center of the beam from the top wall to the bottom wall.

29. The beam as defined in claim 28 in which an air spring piston is integrally formed into the top wall of the beam.

* * * * *